United States Patent Office 3,373,115

Patented Mar. 12, 1968

3,373,115
CLEANING SOLUTION FOR PRINTING PLATES

Hartmut Steppan, Wiesbaden-Dotzheim, Germany, assignor, by mesne assignments, to Azoplate Corporation, Murray Hill, N.J.

No Drawing. Filed Oct. 1, 1964, Ser. No. 400,943
Claims priority, application Germany, Oct. 14, 1963, K 50,998
2 Claims. (Cl. 252—153)

Light-sensitive material for the production of planographic and offset printing plates comprises a support and a light-sensitive coating of a nature such that, upon exposure of the coating to light through an original, a chemical change occurs in the areas exposed to light which renders these areas either more or less soluble in water or other solvents than the unexposed areas. The more soluble areas of the coating are then removed by treatment with a suitable solvent.

In the case of negative-working printing plates, the light-sensitive coating is such that the unexposed areas are more soluble than the exposed areas, and these unexposed areas of the coating are normally removed by treatment with water or an aqueous developing solution. In order to strengthen the water-insoluble products remaining in the exposed or image areas after this treatment, the image areas are often treated with a suitable lacquer, for example an emulsion lacquer, the aqueous or dispersing phase of which is a colloidal solution of gum arabic in water and the dispersed phase comprises epoxy resins and dyes. Other suitable lacquers are described in Germany Patent No. 1,143,710, and Belgian Patents Nos. 625,786 and 625,787. Such copying material, after exposure, proper development and, if required, lacquering, yields excellent printing plates.

Sometimes, however, the original which is to be copied has insufficient opacity necessary to yield a satisfactory copy. If a negative-working presensitized copying material is exposed under such an original until optimum decomposition by light is achieved in the areas which light can reach without hindrance, exposure of the non-image areas can easily occur through insufficiently opaque portions of the original, with the result that, after development and inking up or lacquering, the non-image areas are to some degree receptive to ink or lacquer and exhibit tone. Similar poor results can also occur when the presensitized copying material is damaged sufficiently by careless treatment (e.g. exposure of the entire surface before or during processing, by storage at too high a temperature or simply through being kept in ordinary storage too long) that tone is produced in the non-image areas after inking up or lacquering.

While slight tone in the non-image areas can sometimes be removed by treatment of the developed and inked-up printing plate with conventional agents, such as an aqueous solution of gum arabic or phosphoric acid, these agents are often ineffectual in the cases where the tone is more pronounced, and are nearly always ineffectual when the printing plate has been lacquered. Printing plates which have accepted substantial amounts of lacquer or ink in the non-image areas have hitherto been regarded as unusable. The invention provides a cleansing solution which will effectively clean such plates.

The invention provides a cleaning solution, for treating negative-working planographic and offset printing plates, which comprises an organic solvent capable of dissolving lacquers and greasy ink, and an acid, having a dissociation constant at 25° C. which is greater than $10^{-4}$, and/or a salt of such acid with ammonia, hydroxylamine, hydrazine or an organic base having a dissociation constant at 25° C. which is less than $10^{-3}$, the acid and/or salt being present in the solution in an amount of at least 0.01 equivalent per liter of solution.

By equivalent amount is meant the amount calculated on the basis of the free or attached acid groups of the acid and this equivalent amount is preferably between 0.01 and 5 equivalents per liter of solution.

In general, the effectiveness of the acids increases with an increase in the dissociation constant. Hydrochloric acid and hydrobromic acid are therefore particularly effective. Other suitable inorganic acids are hydriodic acid, sulfuric acid, amidosulfuric acid, perchloric acid, nitric acid, fluoroboric acid, orthophosphoric and pyrophosphoric acid, o-phosphorous acid and hypophosphorous acid. Suitable organic acids are alkenyl phosphonic and alkyl phosphonic acids, for example vinyl phosphonic acid, methylphosphonic acid and polyvinyl phosphonic acid; aliphatic and aromatic monosulfonic and polysulfonic acids such as methane-sulfonic acid, benzenesulfonic acid, mesitylenesulfonic acid and naphthalene-1,5-disulfonic acid; aliphatic and aromatic monocarboxylic, polycarboxylic or hydroxycarboxylic acids, aromatic monocarboxylic and polycarboxylic or hydroxycarboxylic acids, which may, in the case of the aromatic acids, contain nuclear substituents, for example formic acid, acrylic acid, oxalic acid, malonic acid, maleic acid, fumaric acid, lactic acid, tartaric acid, polyacrylic acid, o-phthalic acid and o-nitrobenzoic acid. Halogenated fatty acids, such as monochloroacetic acid, dichloroacetic acid, trichloroacetic acid, fluorochloroacetic acid, trifluoroacetic acid, dibromosuccinic acid and cyanic fatty acids, for example cyanoacetic acid, are also suitable. The organic phosphonic, sulfonic and carboxylic acids should preferably contain not more than ten carbon atoms per acid group since the effective part of the molecule is the acid group and, in general, it is not advantageous for the acid group to represent too small a part of the molecule.

Dibasic or polybasic acids may be used as neutral or acid salts with ammonia, hydroxylamine, hydrazine or organic bases. They may also be used in the form of acid metal salts or may be partly esterified with aliphatic alcohols or phenols of low molecular weight, provided that these acid derivatives contain at least one free acid group having a dissociation constant greater than $10^{-4}$. Thus, sodium hydrogen sulfate and ethyl sulfuric acid may be used.

It is advantageous to use water-soluble acids, but acids which are sparingly soluble in water may also be used. Exemplary of such sparingly soluble acids are o-phthalic acid and o-nitrobenzoic acid. It is desirable, but not absolutely necessary, that the acid should form a homogeneous phase with the organic solvent. A suspension of the acid in the solvent or mixture of solvents can, however, be used, provided the acid is to some extent soluble in the solvent.

The organic bases used to form salts of these acids are preferably not more strongly basic than ammonia. Especially preferred are weak organic bases having dissociation constants at 25° C. which are less than $10^{-8}$. Bases having dissociation constants at 25° C. between $10^{-8}$ and $1.79 \cdot 10^{-5}$ (the dissociation constant of ammonia) may conveniently be used in conjunction with the particularly strong acids. In conjunction with these acids, still stronger bases with dissociation constants up to $10^{-3}$ (measured at 25° C.) can be used, although generally no further advantages are obtained.

The following are exemplary of suitable weak bases; aromatic amines, such as aniline, toluidines and xylidines, $\alpha$- and $\beta$-naphthylamine and its derivatives containing an alkyl or aryl substituent on the nitrogen atom, for example monomethylaniline, dimethylaniline and diphenylamine; heterocyclic bases, such as quinoline and its alkylation products, for example quinaldine, carbazole, N-ethylcarbazole, acridine, phenothiazine and benzimidazole; and acyclic and cyclic carboxylic acid amides, especially those containing less than ten carbon atoms in the molecule, for example acetamide, dimethylformamide, diethylformamide, dimethylacetamide, diethylacetamide, urea and N-methylpyrrolidone-(4). These latter bases are readily soluble in water and have only slight toxicity. Carboxylic acid amides which contain more than ten carbon atoms in the molecule may, however, also be used. If the bases are not to serve simultaneously as a solvent, they are desirably used in, at the most, equivalent amounts with respect to the acid with which they are used.

Naturally, the acids are used only in the form of salts with the above bases in the case of very strong acids. Weaker acids, for example those having a dissociation constant less than 1 are used preferably in free acid form since even in this form they are very mild in their effect.

The effectiveness of the cleaning solutions according to the invention is dependent not only upon the nature of the acid used but also upon the dissolving power of the solvent. The solvent preferably should be at least partly, and preferably completely, miscible with water. The solvent must also be capable of dissolving the resins which are contained in the lacquers normally used in copying, and also the protective inks used in copying, since the purpose of the cleaning solution is complete, or at least partial, solution of the resin components and ink which have been deposited on the non-image areas.

Preferably in conjunction with the stronger of the acids claimed, a large number of other organic solvents or mixtures thereof can be used. Exemplary of suitable organic solvents are carboxylic acid amides, such as dimethylacetamide, diethylformamide and N-methylpyrrolidone-(4); ethers and esters, especially those of ethylene glycol and its homologues, for example ethyleneglycolmonoethyl ether, ethyleneglycolmonomethyl ether acetate, ethyleneglycolmonobutyl ether and di-ethyleneglycolmonoethyl ether; tetrahydrofurfuryl alcohol, diacetone alcohol, tetrahydrofuran and butyl acetate. Ketones, such as acetone, butanone and diisobutylketone, and alkanols, for example amyl alcohol, can also be used. The solvent is preferably of low volatility. In cases where a mixture of solvents is used it is preferable that these be in the form of homogeneous solutions.This, however, is not absolutely necessary. The cleaning solution may also be in the form of a liquid two-phase system, for example an emulsion. In this case, care should be taken that the two phases are well mixed before the cleaning solution is used. The same is true when there is a liquid two-phase system between the solvent or solvent mixture and the acid used.

In some cases, it is desirable to include in the cleaning solution between 1 and 50% by volume of water, or an aliphatic alcohol such as diisopropyl alcohol, or a polyol, preferably one which is liquid at room temperature, such as ethylene glycol or glycerin, or an aromatic hydrocarbon which is liquid at room temperature, such as benzene, toluene, o-, m- and p-xylene or mixtures thereof, or an aliphatic or cycloaliphatic hydrocarbon, such as hexane, cyclohexane or benzene. The solution may also include a dye, for example a triphenylmethane dye or an azo dye, a wetting agent, and an agent which increases the hydrophilic properties of the surface of the support, for example cellulose ether in the case of an aluminum support.

The proportions between solvent and acid, in free form or wholly or partly in the form of one of the above-mentioned salts, can be varied within wide limits. Cleaning solutions which give good results are generally obtained by adding, per liter of solvent or solvent mixture, 0.01–5, preferably 0.1–1 equivalent of acid in free or combined form. If polybasic acids are used, there are to be considered as acid equivalents only the acid dissociation steps which in free form have dissociation constants greater than $10^{-4}$. Within these limits, there are used in larger amounts preferably the less strong acids and in smaller amounts the specially strong acids. The amount of acid may also be outside the above limits and may, for example, be greater, up to 10 equivalents. In this case, however, no further advantage is obtained. When amounts of less than 0.01 equivalent per liter are used, the desired effect is generally not sufficient for practical use.

If the damage to the printing plate or the original has not been detected, the undesired tone in the non-image areas does not appear until after the printing plate has ben developed and inked up or lacquered. In this case, the treatment with the cleaning solution is carried out after inking up or lacquering the plate. In cases, however, in which it is known before exposure or development that the printing plate will show a tendency to tone, the plate may be treated with the cleaning solution after development and prior to lacquering and inking up. However, in some cases the treatment with the cleaning solution may be effected immediately after exposure. In this case, it is sometimes possible to use the cleaning solution as the developing solution.

The application to the printing plate of the cleaning solution may be effected by distribution of the solution over the entire plate, within a period of 30–60 seconds, with gentle hand pressure. For a DIN/A4 plate, 3 to 5 ml. of solution are usually sufficient. The printing plate is then wiped dry, for example with a fresh pad of cotton, and then cleaned with water. If the plate still shows some tone after one treatment with the solution, the treatment may be repeated one or more times.

The following are examples of cleaning solutions according to the invention, parts by weight and parts by volume being, respectively, in grams and milliliters.

*Example 1*

| | | |
|---|---|---|
| Isopropanol | parts by volume | 30 |
| N-methylpyrrolidone | do | 10 |
| Ethyleneglycolmonobutyl ether | do | 45 |
| Glycerine | do | 15 |
| Aqueous hydrochloric acid (36.5%) | do | 1 |
| Phosphoric acid (85%) | parts by weight | 2 |

*Example 2*

| | | |
|---|---|---|
| Isopropanol | parts by volume | 30 |
| N-methylpyrrolidone | do | 5 |
| Ethyleneglycolmonobutyl ether | do | 50 |
| Glycerine | do | 15 |
| Urea nitrate | part by weight | 1 |

*Example 3*

| | Parts by volume |
|---|---|
| N-methylpyrrolidone | 100 |
| Aqueous hydrochloric acid (36.5%) | 10 |

*Example 4*

| | | |
|---|---|---|
| Ethyleneglycol-monobutyl ether | parts by volume | 55 |
| Isopropanol | do | 30 |
| Glycerine | do | 15 |
| Benzenesulfonic acid | parts by weight | 10 |

*Example 5*

| | | |
|---|---|---|
| Dimethylacetamide | parts by volume | 100 |
| Xylene (mixture of isomers) | do | 5 |
| Maleic acid | parts by weight | 7 |

*Example 6*

| | | |
|---|---|---|
| Dimethylformamide | parts by volume | 100 |
| Aqueous hydrochloric acid (36.5%) | part by weight | 0.1 |

*Example 7*

| | | |
|---|---|---|
| Dimethylformamide | parts by volume | 100 |
| Formic acid | parts by weight | 23 |

*Example 8*

| | | |
|---|---|---|
| Diethylformamide | parts by volume | 100 |
| o-Phthalic acid | parts by weight | 10 |

*Example 9*

| | | |
|---|---|---|
| 2-phenoxyethanol | parts by volume | 100 |
| Water | do | 50 |
| Alkarylpolyglycol ether marketed under the name "Hostapalw" | parts by weight | 2.5 |
| Hydrobromic acid (63%) | do | 0.45 |

*Example 10*

| | | |
|---|---|---|
| Dioxane | parts by volume | 75 |
| Water | do | 15 |
| Methanesulfonic acid (96%) | part by weight | 0.75 |

*Example 11*

| | Parts by volume |
|---|---|
| Dimethyl formamide | 99 |
| Aqueous hydrochloric acid (36.5% by weight) | 1 |

It will be obvious to those skilled in the art that many modifications may be made within the scope of the present invention without departing from the spirit thereof, and the invention includes all such modifications.

What is claimed is:

1. A process for removing undesired tone from the non-image areas of a negative-working planographic printing plate which comprises treating the plate with a solution consisting essentially of effective amounts of an organic solvent capable of dissolving lacquers and greasy ink, and a compound selected from the group consisting of hydrochloric acid, hydrobromic acid, and salts of such acids with a base selected from the group consisting of ammonia, hydroxylamine, hydrazine, and aromatic amines and carboxylic acid amides having a dissociation constant less than $10^{-3}$ at 25° C., the compound being present in the solution in a quantity of 0.01 to 10 equivalents per liter of total solution.

2. A process according to claim 1 in which the compound is present in a quantity not in excess of about five equivalents per liter of solution.

References Cited

UNITED STATES PATENTS

| | | | |
|---|---|---|---|
| 2,152,406 | 3/1939 | Ducamp et al. | 252—143 |
| 3,250,644 | 5/1966 | Marcus | 134—41 |
| 3,248,332 | 4/1966 | O'Connor | 252—143 |
| 2,780,168 | 2/1957 | Nichols | 252—143 XR |
| 2,937,940 | 5/1960 | Weisberg et al. | 252—143 XR |

LEON D. ROSDOL, *Primary Examiner.*

ALBERT T. MEYERS, *Examiner.*

J. T. FEDIGAN, *Assistant Examiner.*